United States Patent [19]

Medley, III

[11] Patent Number: 4,818,385

[45] Date of Patent: Apr. 4, 1989

[54] FILTER WITH HIGH PRESSURE INDICATOR

[76] Inventor: Frank W. Medley, III, 45 E. 18th St., Cookeville, Tenn. 38501

[21] Appl. No.: 91,595

[22] Filed: Aug. 31, 1987

[51] Int. Cl.$^4$ .............................................. B01D 35/14
[52] U.S. Cl. ....................................... 210/90; 210/95; 210/130; 210/168; 210/DIG. 17
[58] Field of Search ........................ 210/90, 91, 94, 95, 210/130, 168

[56] References Cited

U.S. PATENT DOCUMENTS

| | | | |
|---|---|---|---|
| 1,832,776 | 11/1931 | Hudson . | |
| 2,729,339 | 1/1956 | McCoy | 210/183 |
| 2,954,751 | 10/1960 | Barnes, Jr. | 116/70 |
| 3,068,831 | 12/1962 | Witchell | 116/70 |
| 3,117,550 | 1/1964 | Cole | 210/90 X |
| 3,149,069 | 9/1964 | Colover | 210/91 |
| 3,150,633 | 9/1964 | Holl | 116/70 |
| 3,200,787 | 12/1963 | Darnell | 116/70 |
| 3,246,624 | 4/1966 | Lowther | 116/70 |
| 3,312,187 | 4/1967 | McKinlay | 116/70 |
| 3,358,836 | 12/1967 | Schmitt | 210/90 |
| 3,368,680 | 2/1968 | Bozek | 210/90 |
| 3,377,980 | 4/1968 | Schindel | 210/90 X |
| 3,381,651 | 5/1968 | McKinlay | 116/70 |
| 3,411,477 | 11/1968 | Kudlaty | 116/70 |
| 3,442,382 | 5/1969 | Rosaen | 210/90 |
| 3,476,251 | 11/1969 | Kudlaty | 210/232 |
| 3,545,616 | 12/1970 | Aspinwall et al. | 210/90 |
| 3,591,003 | 7/1971 | Cooper | 210/90 |
| 3,812,816 | 5/1974 | Juhasz | 210/90 X |
| 3,879,289 | 4/1975 | Aspinwall et al. | 210/90 |
| 3,992,296 | 11/1976 | Nobuta | 210/90 |
| 4,006,083 | 2/1977 | Westervelt et al. | 210/90 |
| 4,029,042 | 6/1977 | Juhasz | 210/90 X |
| 4,139,466 | 2/1979 | Rosaen | 210/90 |
| 4,194,974 | 3/1980 | Jonsson | 210/90 |
| 4,304,663 | 12/1981 | Manders | 210/90 |
| 4,426,284 | 1/1984 | Mitchell et al. | 210/90 |
| 4,454,037 | 6/1984 | Conterio et al. | 210/120 |
| 4,515,690 | 5/1985 | Yasurhara | 210/90 |
| 4,626,344 | 12/1986 | Fick et al. | 210/90 |
| 4,651,670 | 3/1987 | Silverwater | 210/90 X |
| 4,654,140 | 3/1987 | Chen | 210/90 |

FOREIGN PATENT DOCUMENTS

| | | | |
|---|---|---|---|
| 743400 | 9/1966 | Canada | 210/168 |
| 2404452 | 8/1975 | Fed. Rep. of Germany | 210/90 |
| 2404453 | 8/1975 | Fed. Rep. of Germany | 210/90 |
| 2141993 | 1/1973 | France | 210/90 |
| 450104 | 7/1936 | United Kingdom | 210/90 |
| 827220 | 2/1960 | United Kingdom | 210/90 |

Primary Examiner—Robert Spitzer
Attorney, Agent, or Firm—Luedeka, Hodges & Neely

[57] ABSTRACT

The specification discloses an externally mounted filter for filtering contaminated fluids from a fluid-containing system. Fluid is conducted from the system to a housing, through a filter element inside the housing, and back to the system. The filter includes an indicator, visible to a person viewing the housing, which is configured to assume an indicating configuration upon exposure to a fluid pressure in the filter in excess of a predetermined level. The filter is configured to discriminate between momentary fluid pressure surges and excess fluid pressure in the filter so that the indicator is not prematurely activated.

15 Claims, 5 Drawing Sheets

FILTER WITH HIGH PRESSURE INDICATOR

The present invention relates to filtering devices and more particularly relates to a fluid filter which provides a visible indication of a clogged filter element to a person viewing the filter.

Fluid systems almost uniformly employ filters to remove contaminants from the system. Filters become saturated with contaminant and must be serviced (inspected, cleaned, or replaced, e.g.) at some point. Traditionally, filters have been serviced on scheduled intervals based on an estimate of filter life rather than actual contaminant saturation. Such things as system age, fluid condition, and environment conditions can affect the rate of saturation of the filter. Waste occurs when the filter is serviced too early. Greater waste occurs when the system is forced to function with an oversaturated filter. This is particularly true in the case of automobile engines which typically have a bypass valve which diverts oil from the filter allowing unfiltered oil to be delivered to moving parts. The operator is unaware that oil is being diverted from the filter and thus, may operate the engine for a prolonged period of time under improper lubricating conditions. Therefore, it is desirable to reduce waste by providing a filter with indicator means to provide a signal that the filter is saturated with contaminant.

In many fluid systems, it is inconvenient or even unsafe to inspect the filter until the system is shut down. This is the case, for example, with the oil filters of conventional automobile engines where close examination of the filter is typically undertaken only when the engine is off, and usually after the engine has cooled. Thus, it is desirable particularly in the case of automobile engine oil filters that the indicator means be activated at the time of saturation and remain activated thereafter so that an indicating condition is visible to a person viewing the filter after the fluid system has been shut down.

The indicator means heretofore described is most easily activated by fluid pressure in the filter since a contaminant saturated filter element restricts fluid flow and increases the back pressure in the filter. This back pressure can be used to activate the indicator means at a predetermined pressure level. A problem arises from the fact that the pressure in a fluid system usually varies with fluid temperature and/or other operating conditions. For example, fluid is often very thick and relatively cool upon start up of the system, and this thick fluid can cause a momentary pressure surge in the system which may activate the indicator means prematurely. Therefore, it is desirable to have a means for discriminating momentary pressure surges from the sustained pressure which is present under normal operating conditions.

The present invention solves the aforementioned problems long associated with fluid systems by providing an externally mounted filter with an indicator means which is configured to signal contaminant saturation of the filter, and means for discriminating a momentary fluid pressure surge in the filter from the sustained pressure which is present in the filter under normal operating conditions. The indicator means assumes a signaling configuration upon the saturation of the filter and is visible to a person viewing the filter from outside the housing even after the fluid system is shut down.

In accordance with the present invention, a filter is provided for use in filtering contaminated fluids from a fluid-containing system. The filter includes a housing for containing fluid in the filter. The housing is sealably connected in flow communication with the fluid-containing system. A filter element is provided inside the housing and fluid is conducted into the filter from the system, through the filter element, and then returned to the system in a filtered condition.

An indicator means disposed in the filter is exposed to fluid pressure and is configured to assume a signaling configuration upon exposure to a fluid pressure in the filter in excess of a predetermined efficient operating level. In the signaling configuration, the indicator means is visible to a person viewing the filter from the outside of the housing. In the preferred embodiment, the indicator means remains in a signaling configuration after the pressure in the filter is reduced to below the predetermined level.

Surge discrimination means are configured to limit exposure of the indicator means to fluid pressure in the filter during the occurrence of fluid pressure surges in excess of the predetermined level so that the indicator means is exposed to the fluid pressure substantially only during periods of sustained fluid pressure in the filter.

The invention is particularly advantageous in circumstances where it is difficult or impractical to service the filter while the system is operating, as in the case of the oil filter of an automobile engine lubricating system, for example. In such a case, and in accordance with the preferred embodiment, the invention provides a means by which contaminant saturation of the filter media is continuously indicated after saturation has occurred with the assurance that the indication is not prematurely given, and with the advantage of inspectability long after the system has been shut down when conditions for inspection of the filter are often more favorable.

The above and other objects and advantages of the present invention will be readily appreciated by those of ordinary skill in the art as the same becomes better understood by reference to the following detailed description when considered in conjunction with the accompanying drawings, in which:

Figure 1:
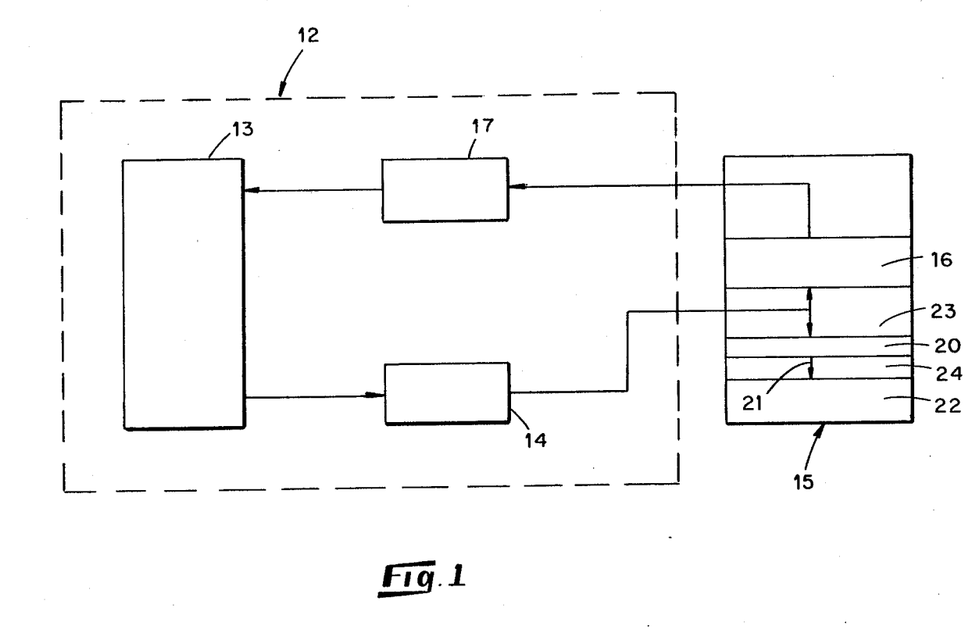
FIG. 1 is a diagrammatic illustration showing the principle of operation of a preferred embodiment of the present invention.

Referring now to the drawings in which like reference characters refer to like or similar parts throughout the several views, initial reference is made to FIG. 1 which illustrates broadly the principle of operation of the various embodiments described below. In the diagram of FIG. 1, reference character 12 generally indicates a fluid-containing system including fluid reservoir means 13 such as the engine box/oil pan of a vehicle engine, for example. The system 12 includes a fluid conveying device represented at 14 which may be an oil pump, for example, and which delivers contaminated fluid from the system to a filter represented generally at 15 incorporating features of the present invention. Inside the filter 15, fluid flows through a filter element indicated by the shaded area 16 where contaminants are removed. The fluid is then passed from the filter 15 back to the system 12 and is therein delivered to a fluid benefited device 17 such as a hydraulic motor or engine crank shaft from which it is returned to the reservoir means 13.

The filter 15 includes surge discrimination means 20 and indicator means 22, the latter of which is exposed to fluid pressure in the filter 15 and configured to assume a signaling configuration upon exposure to fluid pressure in the filter 15 in excess of a predetermined level, and which is visible in its signaling configuration to a person viewing the filter 15 from the outside. Preferably, the indicator means 22 remains in a signaling configuration after the predetermined pressure in the filter drops to below the predetermined level so that it will indicate contaminant saturation even after the system is shut down. The surge discrimination means 20 is configured to limit exposure of the indicator means 22 to fluid pressure in the filter during the occurrence of fluid pressure surges in the filter 15 which are in excess of the predetermined level so that the indicator means 22 is exposed to the fluid pressure substantially only during periods of sustained fluid pressure in the filter.

As used herein, the term "sustained fluid pressure" is intended to refer to situations in which variables such as fluid temperature, viscosity, flow rate and pressure in the system 12 are essentially stabilized, i.e., normal operating conditions. In contrast, momentary pressure surges often occur, especially at system start up when the fluid is usually cool and relatively thick as compared to the condition of the fluid during normal operating conditions. As used herein, the term "pressure surges" is intended to refer to any essentially temporary pressure fluctuation which produces a pressure in excess of the predetermined pressure level and which is caused by factors other than a clogged or contaminant saturated filter.

In FIG. 1, reference character 23 represents an active chamber in the filter 15 on the high pressure side of the filter element 16 adjacent the entry of fluid into the element. Reference character 24 represents a passive chamber located between the surge discrimination means 20 and the indicator means 22. During normal operating conditions, the surge discrimination means 20 provides substantially unrestricted fluid flow communication between the chambers 23 and 24 as indicated by arrow 21. However, during the occurrence of fluid pressure surges, the surge discrimination means 20 restricts fluid flow communication between the chambers 23 and 24 to limit the exposure of the indicator means 22 to the fluid pressure in chamber 23 to prevent premature activation of the indicator means. As will be described, the saturation condition is preferably continuously indicated once it is reached so that inspection following shut down of the system will reveal the condition.

The filter 15 is connected in fluid flow communication with the fluid-containing system 12 by suitable means which will differ depending on the system. In the case of an oil filter of an automobile engine, for example, the filter 15 screws directly onto the engine block adjacent the oil pump.

Figure 2A:
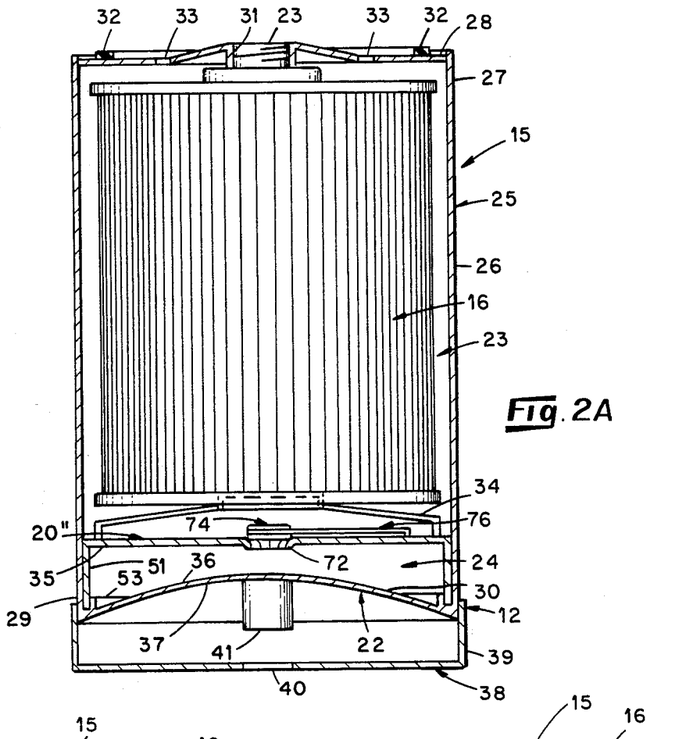
FIG. 2A is an elevational fragmentary view, partially in section, illustrating features of a filter constructed in accordance with one embodiment of the invention and its configuration under fluid pressure surge conditions.
Figures 2B, 2C:
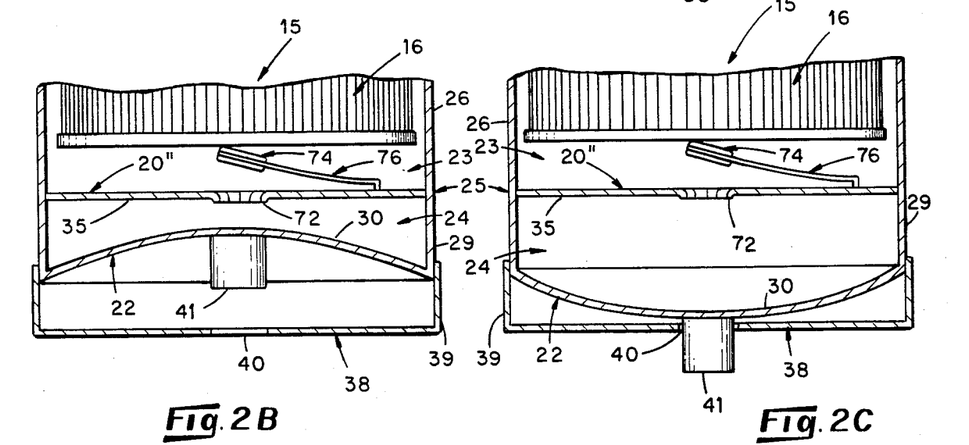
FIG. 2B is a view of the filter shown in FIG. 2A under normal operating conditions with the fluid pressure in the filter below a predetermined level.
FIG. 2C is a view of the filter shown in FIG. 2A under normal operating conditions with the fluid pressure in the filter above the predetermined level.

FIGS. 2A, 2B and 2C illustrate features of one embodiment of the invention under various operating conditions. The filter 15 includes a housing 25 defined by a cylindrical tube 26 enclosed at its base end 27 by a circular mounting plate 28 and at its outboard end 29 by a circular indicator plate 30 forming a part of one form of the indicator means 22 as hereinafter described. Each end is suitably sealed for containing fluid.

One manner in which the filter 15 may be mounted to the fluid system is shown in FIG. 2A which illustrates a conventional connection configuration for vehicle oil filters by which the same is received onto an engine block in fluid flow communication with the lubricating system. As shown in the drawing, the mounting plate 28 includes an internally threaded opening 31 which is formed in the center of the mounting plate 28, and which is received onto a threaded pipe (not shown) extending from the engine block.

A compression seal 32 configured as a flat annular ring is secured to the plate 28 in a suitable fashion adjacent to and essentially concentric with the outer edge of the plate, and is compressed between a surface of the engine block and the mounting plate when the filter 15 is tightened onto the block. Thus, the compression seal 32 together with the threaded opening 31 sealably connects the filter 15 to the system 12, or in the case of an oil filter, to a vehicle engine block.

Figure 2D:
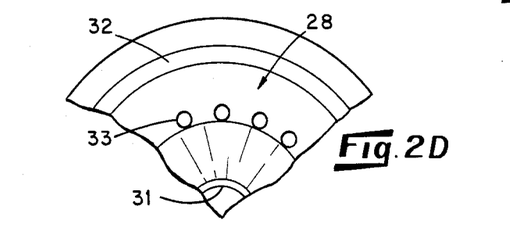
FIG. 2D is a fragmentary top view of the filter of FIG. 2A.

Referring now to FIGS. 2A and 2D and in accordance with a conventional arrangement, fluid preferably flows into the housing 25 through perforations 33 formed in the mounting plate 28 between the opening 31 and the seal 32. The filter element 16 is disposed within the housing 25 so that substantially all fluid flow must pass through the element. While many types and shapes of filter elements may suffice, the preferred filter element 16 has cylindrical filtering walls disposed concentric with the cylindrical tube 26 of the housing 25 but having a smaller radius than the tube 26 so that an annular cavity is defined between the filtering walls and the inside surface of the housing 25. The preferred element 16 also is sealably connected at one end to the mounting plate 28 and is substantially closed at the other end so that fluid must pass through the filtering walls of the filter element 16 before exiting the filter 15.

Inside the filter 15, the element 16 includes a space (not shown) in its center into which filtered fluid flows and from which fluid is conducted through the opening 31 in the mounting plate 28, and then back to the system 12 in a filtered condition. The element 16 may be supported and urged against the mounting plate 28 by a non-flow restricting resilient member 34 (shown only in FIG. 2A) resting on an annular base or partition plate 35 which is supported in the housing 25 by suitable means and which forms a part of the surge discrimination means 20 as hereinafter described. One manner in which the partition plate 35 is supported in the housing 25 includes provision of a downwardly extending annular flange 51 (shown only in FIG. 2A) resting on the outside edge of the plate 30. The flange 51 may be maintained in position by welding, for example, or by upwardly projecting tabs 53 on the plate 30. It is noted that the partition plate 35 does not limit exposure of the indicator plate to the pressure of fluid in the filter 15 during normal operating conditions.

It will be appreciated that as fluid passes through the filter element 16, it encounters a certain resistance to flow owing to the presence of the element, which resistance is, generally speaking, translated into fluid pressure exerted against the housing 25. When the filter is relatively clean, the pressure exerted against the housing 25 is relatively low. As contaminant from the fluid is deposited on the filter element 16, more and more resistance is encountered by the fluid and more and more pressure is exerted against the housing 25. With most any fluid system, there is a predetermined level at which this pressure cannot be efficiently tolerated. In a fluid system such as the lubricating system of a vehicle engine, for example, sustained fluid pressure in the housing 25 above about 90 p.s.i. during normal operating conditions is considered indicative of contaminant saturation. It is this predetermined pressure which is used in the present invention to operate the indicator means 22. It is also noted in this regard that many fluid systems include a fluid flow bypass circuit which bypasses the filter if the back pressure exceeds a certain level. Thus, it is preferred that the predetermined pressure level at which the indicator means 22 is activated be below the pressure at which the bypass circuit is activated.

In the embodiment shown in FIGS. 2A-2C, the indicator means 22 is provided by forming the indicator plate 30 so that its inside surface 36 facing the partition plate 35 has a convex configuration, and its outside surface 37 facing away from the plate 35 has a concave configuration. A false bottom plate 38 with short cylindrical side walls 39 is secured over the outboard end 29 of the housing 25. An opening 40 in the center of the false bottom plate 38 is aligned with a stem 41 which extends from the approximate center of the outer surface 37 of the indicator plate 30.

The configuration of the indicator plate 30 shown in FIG. 2A is that which exists when the pressure of fluid in contact with its inside surface 36 is below the predetermined level, and is referred to hereinafter as the non-extended configuration. The curvature and flexibility of the materials of the plate 30 are selected to provide an internal bias towards the non-extended configuration capable of withstanding fluid pressure in the filter and remaining in the non-extended configuration until fluid pressure adjacent the surface 36 exceeds the predetermined level, at which point the force of the pressure overcomes the bias causing the plate 30 to "pop out" into an essentially reverse configuration in which the inside surface 36 is convex and the outside surface 37 is concave. This configuration is shown in FIG. 2C and is referred to hereinafter as the extended configuration of the plate 30. The same curvature and flexibility which holds the plate 30 in the non-extended configuration is operative to lock the plate in the extended configuration.

The indicator stem 41, which along with the indicator plate 30 is essentially hidden from view by the false plate 38 under normal operating conditions, is employed to translate the movement of the plate 30 between its non-extended and extended configurations to a visible signal. In this regard, the length of the indicator stem 41 is selected to approximate the distance from its mounting point on the indicator plate 30 to the opening 40 of the false plate 38 when the plate 30 is in its non-extended configuration. Thus, in the non-extended configuration, the indicator stem 41 projects to a point which is generally flush with the false plate 38. Movement of the indicator plate 30 to its extended configuration (see FIG. 2C) propels the indicator stem 41 through the opening 40 so that a substantial length extends outside the housing 25 generally perpendicular to the false plate 38, and is readily visible from outside the housing 25 to indicate a saturated condition. This is particularly advantageous in situations where the position or orientation of the filter makes observation of the condition of the filter difficult leading to uncertainty and possibly erroneous conclusions as to the need for replacement, since the extension of the stem 41 is highly visible.

It will be appreciated that the particular form of the indicator plate 30 which has been shown and described offers the advantage of simplicity of construction and operation. However, the plate 30 may take on other forms consistent with the object of deformation at the predetermined pressure such as by forming only a portion of the plate with the aforementioned convex/concave shape or by providing a generally truncated cone-shaped depression in an otherwise generally flat plate, for example, all of which may be constructed to deform from a non-extended to an extended configuration to indicate a saturated condition. Also, it may be that omission of the false bottom plate 38 and stem 41 will be advantageous in certain circumstances such as where space limitations dictate a maximum length of the filter or where the extended configuration of the indicator plate 30 is readily observable without the aid of these features.

Figure 3A:
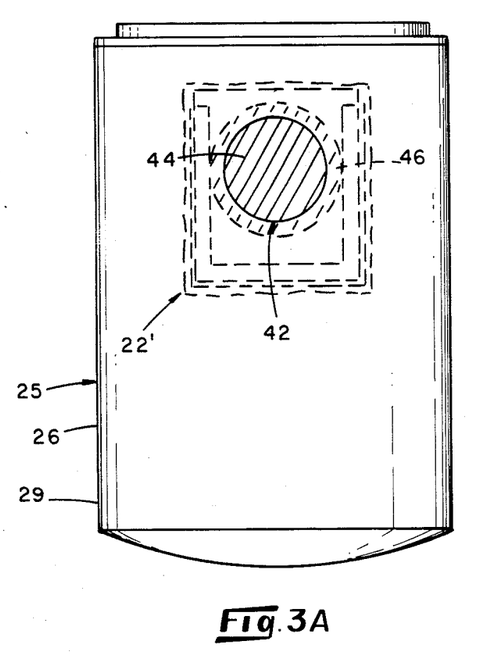
FIGS. 3A and 3B are elevational front and side fragmentary views, respectively, partially in section, illustrating features of a filter constructed in accordance with another embodiment of the invention.
Figure 3B:
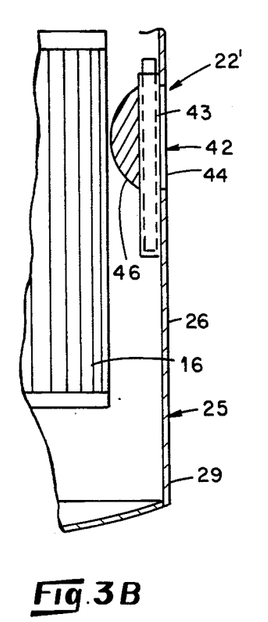

Referring to FIGS. 3A and 3B, another embodiment of the indicator means 22' is shown. In this embodiment, a sight indicator 42 is attached to the cylindrical tube 26 of the housing 25. The sight indicator 42 has an overflow cavity 43 adjacent the cylindrical tube 26 and a transparent sight glass 44 sealably imposed over the overflow cavity 43 in a position such that a person may view the overflow cavity 43 from outside the housing 25 through the sight glass 44. A colored liquid is contained in a solution reservoir 46 which is exposed to fluid pressure inside the housing 25. The reservoir 46 may be provided by a small plastic bag or the like and is positioned or colored to shield the liquid from view through the glass 44. A seal is formed between the cavity 43 and the reservoir 46 such as by a rupturable membrane, for example, which is configured to rupture and release the opaque liquid into the cavity 43 upon exposure of the reservoir 46 to a pressure in excess of the predetermined level. The opaque solution is selected so that when present in the overflow cavity 43, it provides a noticeable contrast to an empty overflow cavity, and thereby clearly indicates to a person viewing the filter the occurrence of a fluid pressure in the filter in excess of the predetermined level. It will be appreciated that the indicator means 22' of FIGS. 3A and 3B may be located at any convenient position on the housing 25. One such location which is particularly advantageous, taking into consideration the surge protection feature of the invention to be subsequently described, is on the outboard end 29 of the housing 25 which enables isolation of the sight indicator 42 from the effect of fluid pressure surges in the filter.

Figure 4:
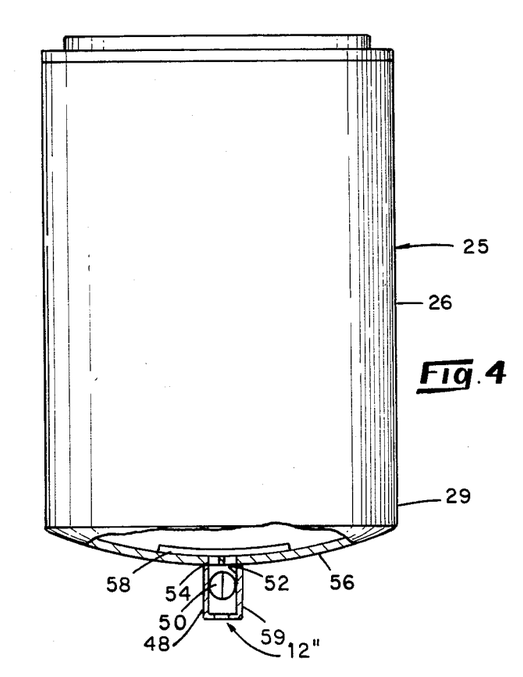
FIG. 4 is an elevational fragmentary view, partially in section, illustrating features of a filter constructed in accordance with yet another embodiment of the invention.

FIG. 4 illustrates another embodiment of the indicator means 22' including an elongate transparent tube 48 which is resiliently radially deformable, and a sliding spherical indicator 50 received in a generally uniform diameter bore 52 of the tube 48. The tube 48 has an open pressure end 54 which extends through an opening in a dome-shaped cap 56 which closes the outboard end 29 of the tube 26. The pressure end 54 of the resilient tube 48 is sealably connected to a rupturable fluid reservoir 58 located inside the housing 25. The reservoir 58 contains fluid and is configured to rupture at the predetermined pressure, and at the location of its connection to tube 48, so that the fluid which it contains enters the pressure end 54 of the tube 48. Also, provision is made to prevent fluid which is to be filtered from leaking out of the housing 25 where the tube 48 extends through the cap 56.

The spherical indicator 50 has a diameter slightly greater than that of the bore 52 of the tube 48 so that movement of the indicator 50 along the bore 52 is resisted by frictional engagement of the indicator with the tube 48. The spherical indicator 50, which is normally mounted at the pressure end 54 of the resilient tube 48, is configured together with the tube 48 so that the frictional resistance to movement of the indicator 50 in the bore 52 is overcome by an increase in the pressure on the side of the indicator facing the reservoir 58 to enable movement of the indicator 50 in the bore 52 from adjacent the pressure end 54 to adjacent an open barrier end 59 upon rupture of the reservoir 58. Though the barrier end 59 is open to the atmosphere, it is configured to prevent passage of the spherical indicator 50 out of the bore 52, thus defining a point of maximum travel for the indicator 50. Movement of the indicator 50 from the pressure end 54 to the barrier end 59 of the tube 48 indicates to a person viewing the filter the occurrence of a fluid pressure in the filter in excess of the predetermined level. Alternatively, it may be desirable to avoid the use of the reservoir 58 by having the pressure end 54 open directly into the housing 25 and configuring the indicator 50 and tube 48 so that fluid does not leak out between the indicator 50 and the inside wall of the tube 48, and so that frictional resistance to movement of the indicator 50 in the bore 52 is overcome at the predetermined pressure.

Heretofore, description of the various embodiments has assumed that the system is experiencing normal operating conditions. FIGS. 2A, 2B, 2C, and 5A through 8B illustrate different forms of the surge discrimination means 20 configured to prevent premature activation of the indicator means 22 by momentary pressure surges, each having its own particular advantages depending on the circumstances. All of the embodiments illustrated preferably utilize partition plate means in the nature of the circular partition plate 35 discussed above with reference to FIGS. 2A through 2C which is disposed across the cylindrical tube 26 of the housing 25 between the indicator means 22 and the filter element 16 to divide the housing into the active and passive chambers 23 and 24 referred to above in connection with FIG. 1. The partition plates of the following embodiments are preferably sealably attached around their circumference to the inside of the cylindrical tube 26 and disposed to lie generally perpendicular to the length of the tube 26, and include means for restricting fluid flow communication between the chambers 23 and 24 during pressure surges. It is noted that the circular, plate-like configuration of the partition plate of the various embodiments represents a preferred form of the same. However, it will be appreciated that other configurations may be used in order to provide a partition means consistent with the invention.

Figure 5A:
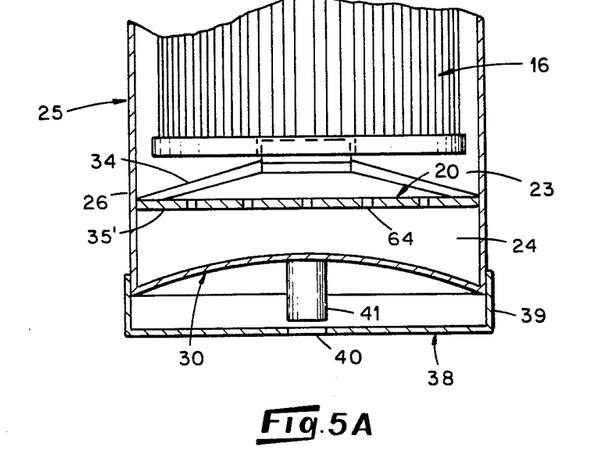
FIG. 5A is an elevational fragmentary view, partially in section, illustrating features of a filter constructed in accordance with an additional embodiment of the invention.
Figure 5B:
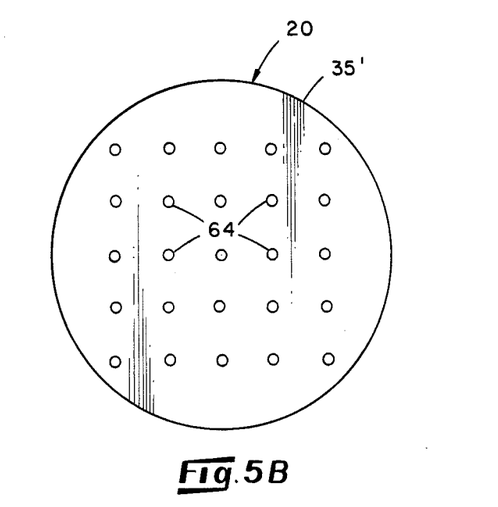
FIG. 5B is a plan view of a partition plate for use in the filter shown in FIG. 3A.

Referring to FIGS. 5A and 5B, one form of the surge discrimination means 20 includes a partition plate 35' having a plurality of flow-through apertures or orifices 64. The orifices 64 are spaced about the partition plate and sized to allow fluid to seep through the plate so that a very low level of flow communication is established between the chambers 23 and 24, but enough to enable gradual equalization of the pressure between the chambers following a sudden or momentary increase in the pressure in the chamber 23 due to a surge condition. This is particularly advantageous where surges arise and dissipate fairly rapidly. The indicator means 22 is therefore exposed substantially only to the fluid pressure in existence during normal operating conditions and will indicate only a saturated or clogged filter element.

Figure 5C:
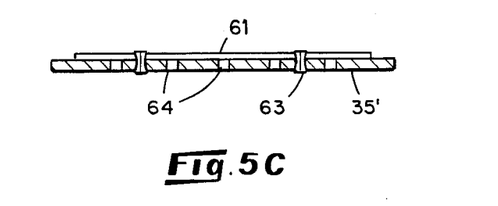
FIG. 5C is a cross-sectional view illustrating an antiflow bulk diaphragm for use with the partition plate of FIG. 5B.

Another feature of the invention related to protection against the effect of surges includes a circular anti-flow back diaphragm 61 shown in FIG. 5C and secured to the upper surface of the plate 35'. The diaphragm 61 is preferably formed of a resiliently flexible material such as rubber, for example, and is secured to the plate 35' at spaced apart locations such as by rivets 63 or by other suitable means. The diaphragm 61 does not significantly restrict flow of fluid out of chamber 24 but provides a restriction against flow into the chamber 24 through the orifices 64 which further limits equalization of the pressure between chambers 23 and 24 during cold starts, for example. The diaphragm 61 may also be used with the other forms of the surge discrimination means and may be annular in configuration if necessary.

Figure 6A:
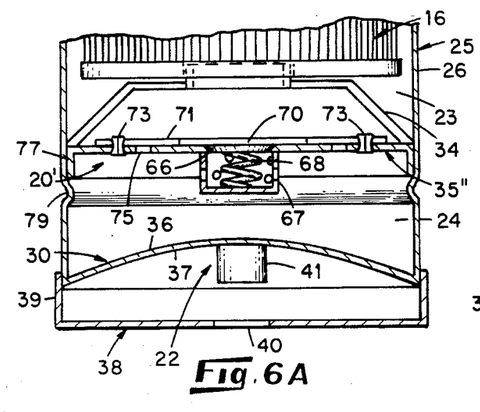
FIG. 6A is an elevational fragmentary view, partially in section, illustrating features of a filter constructed in accordance with a further embodiment of the invention and their configurations during periods of sustained fluid pressure in the filter (no surges) with the fluid pressure in the filter below a predetermined level.
Figure 6B:
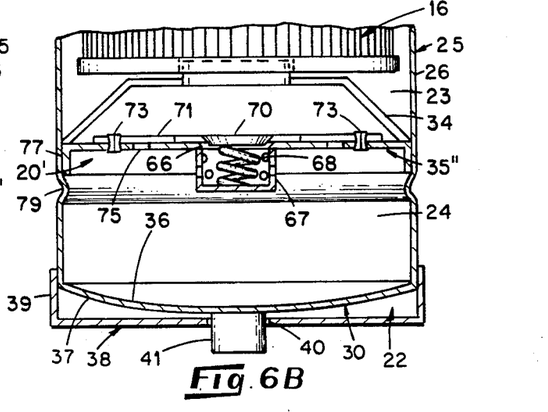
FIG. 6B is a view of the filter shown in FIG. 4A under surge conditions and after the occurrence of a fluid pressure in the filter above a predetermined level.

An additional form of the surge discrimination means 20' is shown in FIGS. 6A and 6B and includes a partition plate 35" provided with a fluid passageway 66, a spring 68, and a valve head 70. Preferably, the fluid passageway 66 is an opening formed in the approximate center of the partition plate 35" concentric with the circumference of the plate. The spring 68 is preferably of the compression type with one end anchored, and the other end floating adjacent the passageway 66 and carrying the valve head 70. In the illustrated embodiment, the anchored end is attached to the base of a perforated enclosure 67 secured to the lower surface of the plate 35". It is understood, however, that the anchored end may be attached to any convenient structure inside the housing 25 or to other suitable structure specifically provided for this purpose. The spring 68 extends through the fluid passageway 66 generally perpendicular to the partition plate 35" to dispose the valve head 70 between the plate and the filter element 16 a sufficient distance above the opening 66 as shown in FIG. 6B to permit essentially unrestricted flow through the passageway 66 under normal operating conditions.

The valve head 70 in union with the floating end of the spring 68 is configured to travel toward and restrict flow through the fluid passageway 66 when the spring 68 is compressed from its extended configuration. Under normal operating conditions with the filter full of fluid, the pressure in the active chamber 23 and the passive chamber 24 is essentially equal so that the bias of the spring 68 is unaffected and the fluid passageway 66 remains essentially open. Under fluid pressure surge conditions and particularly system start up (the filter is empty), fluid pressure in the active chamber 23 (surrounding the element 16) is increasing rapidly causing a rush of fluid into the passive chamber 24 through the space between the head 70 and the passageway 66. This exerts a force on the head 70 which, assuming the proper flow conditions and temperature, is sufficient to pull the head 70 against the plate 35" and compress the spring 68. As a result, flow through the opening 66 is restricted until such time as the pressure difference across the plate 35" drops (by leakage between the head 70 and the plate 35") and its tendency to keep the head 70 against the plate is overcome by the force of the spring 68. After this point is reached, the pressure in chambers 23 and 24 is equalized. Then, assuming the surge has subsided, the fluid pressure to which the indicator means 22 is exposed is that which is in existence during normal operating conditions so that activation will occur only if such pressure exceeds the predetermined level. It may be advantageous to provide small grooves or the like in either of the interengaging surfaces of the valve head 70 and the plate 35" to allow fluid to seep therebetween similar to the orifices 64 shown in FIGS. 5A and 5B and thus facilitate gradual equalization of the pressure between the chambers 23 and 24.

An annular anti-flow back diaphragm 71 may be secured to the upper surface of the plate 35" by rivets 73, for example, and together with openings 75 in the plate 35" provide the function described above in connection with the diaphragm 61 shown in FIG. 5C.

Also illustrated in FIGS. 6A and 6B is an additional means by which the various forms of the partition plate may be supported in the housing 25. As shown, the plate 35" includes a downwardly extending annular flange 77 which rests on an inwardly extending ledge 79 conveniently provided by deforming the cylindrical tube 26 radially inwardly around the circumference of the cylinder 26.

With reference again to FIGS. 2A-2C, yet another form of the surge discrimination means 20" includes the partition plate 35 previously indicated which has a fluid passageway 72, a valve head 74, and a bimetallic strip 76. Preferably the fluid passageway 72 is a single opening formed in the center of the partition plate 35 and configured to allow fluid to pass essentially unrestricted from the active chamber 23 to the passive chamber 24. The bimetallic strip 76 has a fixed end which may be anchored to the plate 35 or by any other suitable means, and a valve end which carries the head 74 adjacent the fluid passageway 72. The head 74 is preferably configured to fit snugly into the passageway 72 to restrict fluid flow through the passageway 72 when so positioned by the strip 76.

The preferred configuration of the strip 76 disposes the valve head 74 in the fluid passageway 72 when the temperature of the strip 76 is below a predetermined temperature historically associated with fluid pressure surges such as cold start ups, for example, and moves the valve head 74 out of the passageway 72 when the strip 76 is above this temperature in the range of temperatures historically associated with normal operating conditions. In the former condition wherein the valve head 74 is disposed in the fluid passageway 72, fluid flow through the fluid passageway is sufficiently restricted to prevent exposure of the indicator means 22 to pressure surges. In the latter condition, the valve head 74 is moved a sufficient distance from the passageway 72 to permit essentially free fluid flow communication between the chambers 23 and 24. Alternatively, the strip 76 can be constructed of a resilient material such as spring steel, for example, and configured to position the valve head 74 closely adjacent the passageway 72 so that a rush of fluid through the passageway will pull the head 74 into the same to restrict fluid flow communication between the chambers 23 and 24 until surge conditions have subsided, in a manner similar to the embodiment described above with reference to FIGS. 6A and 6B. Also, although not shown, the diaphragm 71 of FIGS. 6A and 6B may be used with the plate 35 which would include appropriate openings to enable emptying of the chamber 24.

Figure 7A:
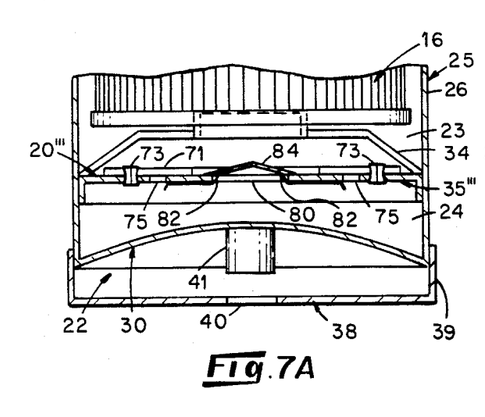
FIG. 7A is an elevational fragmentary view, partially in section, illustrating features of a filter constructed in accordance with another embodiment of the invention operating under pressure surge conditions.
Figure 7B:
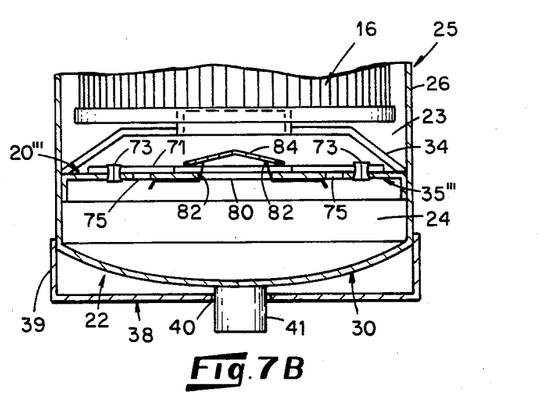
FIG. 7B is a view of the filter shown in FIG. 7A operating under normal operating conditions with the fluid pressure in the filter above a predetermined level.

Referring now to FIGS. 7A and 7B an additional form of the surge discrimination means 20''' is shown which employs a partition plate 35''' having a fluid passageway 80 which is preferably a circular opening formed in the approximate center of the plate. A plurality of thermostatic arms 82, each having an anchored end for attachment to the partition plate 35''' and a valve end for attachment to a valve head 84 to be described, are slidably mounted to the plate substantially equidistant around the circumference of the passageway 80 and on the side of the plate facing away from the filter element 16.

Preferably the arms 82 curve through the passageway 80 to dispose the valve ends a short distance past and above the plate 35''' toward the filter element 16. The valve head 84 is preferably configured as a cupped circular disc with a concave surface facing the partition plate 35''' and supported between the plate and the filter element 16 on the valve ends of the thermostatic arms 82 which are attached to the concave surface of the head 84. The valve ends of the arms 82 are preferably spaced equidistant about a circle concentric with the circumference of the valve head 84 to dispose the valve head 84 generally concentric with a line extending through the center of the passageway 80 perpendicular to the plate 35''' and to dispose the circumference of the valve head 84 in a plane essentially parallel to the plate. The arms 82 are preferably bimetallic as in the case of the strip 76 described above with reference to FIGS. 2A-2C, and are configured to dispose the valve head 84 across the passageway 80 with the circumference of the head 84 engaging the partition plate 35''' below a predetermined temperature in a range historically associated with fluid surge conditions, and to thereby restrict fluid flow across the partition plate during fluid pressure surges for reasons which are now clear. The arms 82 are further configured to change shape upon reaching the predetermined temperature and move the valve head 84 away from the fluid passageway 80 a sufficient distance to permit essentially unrestricted fluid flow communication between the chambers 23 and 24. As with the strip 76, the arms 82 can also be constructed of a resilient material such as spring steel, for example, and configured to position the valve head 84 closely adjacent the passageway 80 so that a rush of fluid through the passageway will pull the head 74 against the plate 35''' to restrict fluid flow communication between the chambers 23 and 24 until surge conditions have subsided.

Figure 8A:
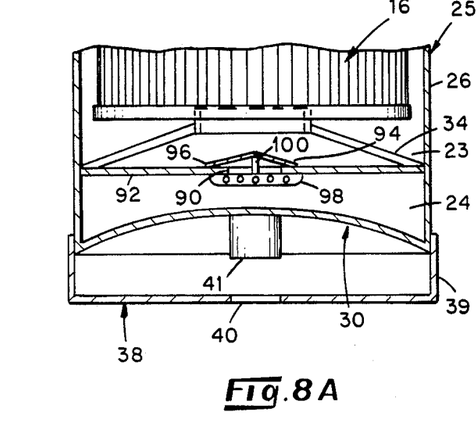
FIG. 8A is an elevational fragmentary view, partially in section, illustrating features of a filter constructed in accordance with still another embodiment and its configuration under fluid pressure surge conditions.
Figure 8B:
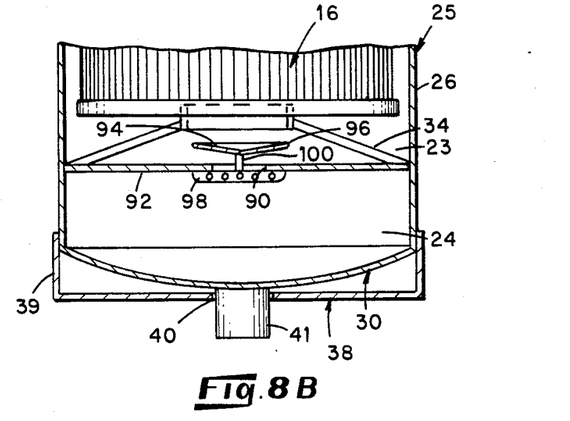
FIG. 8B is a view of the filter shown in FIG. 8A operating during periods of sustained fluid pressure in the filter (no surges) with the fluid pressure in the filter above a predetermined level.

Another form of the surge discrimination means similar to that described above with reference to FIGS. 2A through 2C and 7A and 7B is shown in FIGS. 8A and 8B. There, a fluid passageway 90 such as is used in previously described embodiments is preferred, being circular and centered in a partition plate 92. A bimetallic disc 94 is mounted adjacent to and above the passageway 90 between the plate 92 and the filter element 16 in close proximity to the passageway, and includes a sealing lip 96 about its circumference. One means by which the disc 94 is mounted includes a perforated member 98 attached to the lower surface of the partition plate 92, and configured to extend across the width of the passageway 90. The perforated member 98 has ample perforations to permit essentially unrestricted fluid flow communication between the active chamber 23 and the passive chamber 24. A mounting stem 100 extends perpendicularly from the perforated member 98 toward the filter element 16. The approximate center point of the disc 94 is fixed to the end of the mounting stem 100 to dispose the sealing lip 96 in a plane substantially parallel to the partition plate 92.

In a preferred form, the disc 94 has one face which is concave and one which is convex and is configured to "snap" at a predetermined temperature to reverse its configuration so that the face which is concave below the predetermined temperature becomes convex, and vice versa. The internal bias of the disc 94 holds it in one configuration or the other. The disc 94 is mounted on the stem 100 so that the face which is concave below the predetermined temperature is adjacent the partition plate 92, as shown in FIG. 8A.

The length of the stem 100, and the dimensions and curvature of the disc 94 are such that the sealing lip 96 sealingly engages the partition plate 92 just outside the edge of the passageway 90 to essentially prevent fluid flow communication between the chambers 23 and 24 below the predetermined temperature. When the disc 94 reaches the predetermined temperature, the disc 94 "snaps" as described above which disengages the sealing lip 96 from the plate 92 allowing essentially free fluid flow communication between the chambers 23 and 24 so that the indicator means 22 is exposed to the fluid pressure in the filter.

Although not shown, it is understood that the diaphragm 71 may be used with the embodiment of FIGS. 8A and 8B with appropriate openings provided in the plate 92.

As mentioned above with regard to the embodiments of FIGS. 2A-2C and FIGS. 7A and 7B, the predetermined temperature at which the disc 94 is set to "snap" is selected based on experience with the particular fluid system involved. It is believed that with any given fluid system, there is a temperature or a range of temperatures below which surges most often occur due primarily to sluggish flow caused by high viscosity. Once this temperature or range of temperatures is established, the disc 94 can be set by its construction to reconfigure itself accordingly. By way of example, and as mentioned above, in an oil filter for a conventional vehicle engine, an activation temperature in the range of from about 145° F. to 150° F. provides reliable protection against premature activation of the indicator means 22 due to momentary fluid pressure surges caused by relatively cool, high viscosity oil.

Although particular embodiments of the invention have been described in the foregoing detailed description, it will be understood that the invention is capable of numerous rearrangements, modifications, and substitutions of parts without departing from the scope of the invention as set forth in the claims below.

What is claimed is:

1. An externally mounted filter for use in filtering contaminated fluids from a fluid-containing system and being adapted to indicate the occurrence of a sustained fluid pressure in the filter in excess of a predetermined pressure level, said filter comprising:
    a housing for containing fluid in the filter;
    means for sealably connecting said housing to the fluid-containing system in flow communication therewith;
    a filter element disposed within said housing for removing contaminants from the fluid;
    indicator means disposed in said filter, said indicator means being exposed to fluid pressure in the filter and configured to assume a signaling configuration upon exposure to a fluid pressure in the filter in excess of the predetermined level, said indicator means being visible in said signaling configuration to a person viewing the filter from the outside of the housing; and
    surge discrimination means configured to limit exposure of said indicator means to fluid pressure in the filter during the occurrence of fluid pressure surges in excess of the predetermined level so that said indicator means is exposed to the fluid pressure in the filter substantially only during periods of sustained fluid pressure and is substantially unaffected by the influence of high pressure during said pressure surges.

2. The filter of claim 1, wherein said indicator means remains in a signaling configuration following exposure to fluid pressure in the filter in excess of the predetermined level.

3. An externally mounted filter for use in filtering contaminated fluids from a fluid-containing system and being adapted to indicate the occurrence of a sustained fluid pressure in the filter in excess of a predetermined pressure level, said filter comprising:
    a housing for containing fluid in the filter;

means for sealably connecting said housing to the fluid-containing system in flow communication therewith;

a filter element disposed within said housing for removing contaminants from the fluid;

indicator means disposed in said filter, said indicator means being exposed to fluid pressure in the filter and configured to assume a signaling configuration upon exposure to a fluid pressure in the filter in excess of the predetermined level, said indicator means being visible in said signaling configuration to a person viewing the filter from the outside of the housing; and surge discrimination means configured to limit exposure of said indicator means to fluid pressure in the filter during the occurrence of fluid pressure surges in excess of the predetermined level so that said indicator means is exposed to the fluid pressure in the filter substantially only during periods of sustained fluid pressure, said surge discrimination means comprising partition means disposed in said filter between said filter element and said indicator means to isolate said element from said indicator means, fluid passageway means for providing fluid flow across said partition means, and restriction means for restricting fluid flow through said fluid passageway means during the occurrence of said surges.

4. The filter of claim 3, wherein said partition means comprises a partition plate and said restriction means comprises a plurality of apertures configured to allow fluid to seep through the apertures to and from said indicator means during periods of sustained fluid pressure in the filter but to restrict the passage of fluid to the indicator means during said surges.

5. The filter of claim 3, wherein said partition means comprises a partition plate and said restriction means comprises:

a fluid passageway located in said partition plate;

spring means having an anchored end and a floating end, said floating end being adjacent the fluid passageway in said partition plate and said spring means being biased to dispose said floating end a distance away from said fluid passageway and configured to provide for movement of said floating end generally toward and away from said fluid passageway of said partition plate;

means for anchoring said anchored end in said housing; and a valve head disposed on said floating end of said spring means and configured to restrict flow through said passageway, said valve head being further disposed, due to the bias of said spring means, a distance away from said fluid passageway during periods of sustained fluid pressure in the filter to permit fluid flow to the indicator means, said distance being sufficiently small and said spring means being configured so that a sudden increase in flow through said passageway overcomes the bias of said spring means causing said valve head to be drawn toward said passageway to restrict flow through said passageway to said indicator means.

6. The filter of claim 3, wherein said partition means comprises a partition plate and said restriction means comprises:

a fluid passageway located in said partition plate; and a temperature responsive valve disposed adjacent said fluid passageway and configured to restrict flow through said passageway when exposed to fluid below a predetermined temperature, said valve being further configured to permit essentially free flow through said fluid passageway when exposed to fluid above the predetermined temperature.

7. The filter of claim 6, wherein said valve comprises:

a bimetallic strip configured to change shape at a predetermined temperature, said strip having a floating end and an anchored end which is anchored to the filter, said floating end being disposed adjacent the fluid passageway in said partition plate, said strip being further configured to dispose said floating end closely adjacent said passageway in said partition plate below said predetermined temperature and to change shape at said predetermined temperature to dispose said floating end in spaced apart relation to said passageway; and a valve head attached to said floating end of said bimetallic strip, said valve head being configured to seat in and restrict the flow of fluid through said passageway when said floating end is disposed closely adjacent said passageway and to be disposed away from said passageway when said floating end is disposed in said spaced relation to said passageway so that fluid flow through said passageway is substantially unrestricted, whereby flow through said passageway is restricted below said predetermined temperature and is substantially unrestricted above said predetermined temperature.

8. The filter of claim 6, wherein said valve comprises:

a valve head configured to seat in and restrict fluid flow through said passageway; and temperature responsive support means connected between said valve head and said partition plate to support said valve head adjacent said passageway, said temperature responsive support means being configured to dispose said valve head in its seated position below said predetermined temperature and to dispose said valve head in spaced apart relation to said passageway above said predetermined temperature so that fluid flow through said passageway is substantially unrestricted above said predetermined temperature.

9. The filter of claim 6, wherein said valve means comprises:

a bimetallic disc having a sealing lip about its circumference;

means for supporting said disc adjacent said passageway; and said disc being configured to propel the sealing lip toward said partition plate to engage said partition plate in response to a change in the temperature of said disc from a temperature above said predetermined temperature to a temperature below said predetermined temperature, said disc being further configured to restrict fluid flow through said passageway when the sealing lip engages said partition plate and to disengage said lip from said partition plate in response to a change in the temperature of said disc from a temperature below said predetermined temperature to a temperature above said predetermined temperature so that fluid flow through said passageway is substantially unrestricted above said predetermined temperature.

10. An externally mounted filter for use in filtering contaminated fluids from a fluid-containing system and being adapted to indicate the occurrence of a sustained fluid pressure in the filter in excess of a predetermined pressure level, said filter comprising:

a housing for containing fluid in the filter;

means for sealably connecting said housing to the fluid-containing system in flow communication therewith;

a filter element disposed within said housing for removing contaminants from the fluid;

indicator means disposed in said filter, said indicator means being exposed to fluid pressure in the filter and configured to assume a signaling configuration upon exposure to a fluid pressure in the filter in excess of the predetermined level, said indicator means being visible in said signaling configuration to a person viewing the filter from the outside of the housing;

surge discrimination means configured to limit exposure of said indicator means to fluid pressure in the filter during the occurrence of fluid pressure surges in excess of the predetermined level so that said indicator means is exposed to the fluid pressure in the filter substantially only during periods of sustained fluid pressure;

said housing comprising:

a cylindrical tube;

a mounting plate disposed across one end of said cylindrical tube; and a circular false bottom plate, said false bottom plate having an opening and being disposed across the end of said cylindrical tube opposite said mounting plate so that said filter element is located generally between said mounting plate and said false bottom plate; and said indicator means comprising:

an end plate disposed between said filter element and said false bottom plate and extending across said tube to close and seal said tube against fluid leakage, said end plate having a first surface adjacent said filter element and exposed to fluid pressure in the filter and a second surface adjacent said false bottom plate, and said end plate being configured so that said first surface is generally convex and said second surface is generally concave below said predetermined pressure, and to deform in response to exposure of said first surface to fluid pressure at or above said predetermined pressure to a configuration in which said first surface is generally concave and said second surface is generally convex, whereby the distance between said second surface and said false bottom plate is decreased when said end plate deforms; and an indicator stem disposed on said second surface and configured and positioned relative to said opening in said false bottom plate so that upon deformation of said end plate, said indicator stem is moved in the direction of said false bottom plate, extends through said opening, and is visible from outside said housing.

11. An externally mounted filter for use in filtering contaminated fluids from a fluid-containing system and being adapted to indicate the occurrence of a sustained fluid pressure in the filter in excess of a predetermined pressure level, said filter comprising:

a housing for containing fluid in the filter;

means for sealably connecting said housing to the fluid-containing system in flow communication therewith;

a filter element disposed within said housing for removing contaminants from the fluid;

indicator means disposed in said filter, said indicator means being exposed to fluid pressure in the filter and configured to assume a signaling configuration upon exposure to a fluid pressure in the filter in excess of the predetermined level, said indicator means being visible in said signaling configuration to a person viewing the filter from the outside of the housing;

surge discrimination means configured to limit exposure of said indicator means to fluid pressure in the filter during the occurrence of fluid pressure surges in excess of the predetermined level so that said indicator means is exposed to the fluid pressure in the filter substantially only during periods of sustained fluid pressure; and said indicator means comprising:

a sight indicator mounted on said housing, said sight indicator having an overflow cavity and a transparent sight glass visible from outside said housing, said sight glass sealably imposed upon said overflow cavity to define a transparent wall through which a person viewing said housing from outside the filter can also view said overflow cavity;

an opaque fluid; and a solution reservoir containing said opaque fluid, said reservoir configured to transfer said opaque fluid into said overflow cavity in response to fluid pressure in the filter in excess of said predetermined level, thereby indicating to a person viewing the housing from the outside of the filter the occurrence of a fluid pressure in the filter in excess of the predetermined level.

12. An externally mounted filter for use in filtering contaminated fluids from a fluid-containing system and being adapted to indicate the occurrence of a sustained fluid pressure in the filter in excess of a predetermined pressure level, said filter comprising:

a housing for containing fluid in the filter;

means for sealably connecting said housing to the fluid-containing system in flow communication therewith;

a filter element disposed within said housing for removing contaminants from the fluid;

indicator means disposed in said filter, said indicator means being exposed to fluid pressure in the filter and configured to assume a signaling configuration upon exposure to a fluid pressure in the filter in excess of the predetermined level, said indicator means being visible in said signaling configuration to a person viewing the filter from the outside of the housing;

surge discrimination means configured to limit exposure of said indicator means to fluid pressure in the filter during the occurrence of fluid pressure surges in excess of the predetermined level so that said indicator means is exposed to the fluid pressure in the filter substantially only during periods of sustained fluid pressure; and said indicator means comprising:

an elongate tube having an open pressure end sealably connected to said housing, an open barrier end spaced from said pressure end by the length of said tube, and an inner bore extending between said barrier end and said pressure end;

a spherical indicator slidably disposed in said inner bore of said tube and having a diameter of about but greater than the inner bore of said tube so that movement of said indicator along said bore is resisted by frictional engagement of said indicator with the wall of said bore;

said spherical indicator having a non-warning position adjacent the pressure end of said tube and a warning position adjacent the barrier end of said tube and said barrier end being configured to prevent movement of said indicator out of said bore through its opening;

a sealed reservoir containing fluid, said reservoir being connected between said open pressure end of said tube and the fluid inside said housing to isolate said open pressure end of said tube from fluid in said housing, and said reservoir being exposed to the fluid in said housing so that the pressure of fluid in said housing is imposed on said reservoir and being configured to release the fluid which it contains into said open pressure end of said tube when the fluid pressure adjacent said reservoir exceeds said predetermined level so that the pressure adjacent the side of said indicator facing said open pressure end increases; and said indicator being configured together with said tube so that the frictional resistance to movement of said indicator in said bore is overcome by an increase in the fluid pressure adjacent the side of said indicator facing said open pressure end to enable movement of said indicator in said bore from said non-warning position to said warning position in response to the increased pressure.

13. The filter of claim 12, wherein said tube is flexible to enable its radial expansion under the influence of said spherical indicator, and is transparent to enable visual observation from outside said housing of the position of said indicator in said bore.

14. An externally mounted filter for use in filtering contaminated fluids from a fluid-containing system and being adapated to indicate the occurrence of a sustained fluid pressure in the filter in excess of a predetermined pressure level, said filter comprising:

a housing for containing fluid in the filter;

means for sealably connecting said housing to the fluid-containing system in flow communication therewith;

a filter element disposed within said housing for removing contaminants from the fluid;

indicator means disposed in said filter, said indicator means being exposed to fluid pressure in the filter and configured to assume a signaling configuration upon exposure to a fluid pressure in the filter in excess of the predetermined level, said indicator means being visible in said signaling configuration to a person viewing the filter from the outside of the housing;

surge discrimination means configured to limit exposure of said indicator means to fluid pressure in the filter during the occurrence of fluid pressure surges in excess of the predetermined level so that said indicator means is exposed to the fluid pressure in the filter substantially only during periods of sustained fluid pressure; and said housing comprising a cylindrical shell having a base end and an outboard end, and said indicator means comprising plate means configured to sealably close said outboard end of said shell, said plate means being further configured to deform in an outwardly visible manner when exposed to the predetermined pressure to provide a visible indication that the predetermined pressure level has been reached.

15. An externally mounted filter for use in filtering contaminated fluids from a fluid-containing system and being adapted to indicate the occurrence of a fluid pressure in the filter in excess of a predetermined pressure level, said filter comprising:

a cylindrical housing for containing fluid in the filter, said housing having a base end and an outboard end and comprising base end closure plate means sealably closing said base end of said housing and configured to sealably connect said base end of said housing to the fluid-containing system in flow communication therewith, and outboard end closure plate means sealably closing said outboard end of said housing;

a filter element disposed in said housing;

means for conducting a flow of fluid from the fluid-containing system through said base end closure plate means to and through said filter element and back through said base end closure plate means to the fluid-containing system so that the fluid is filtered; and indicator means disposed on the outside surface of said housing, said indicator means comprising a generally depressed region formed on the outside surface of said housing, being exposed to the fluid pressure in said filter, and being configured to deform outwardly an elevation extending across at least a portion of said plate upon exposure to said predetermined pressure to provide a visible indication that the predetermined pressure level has been reached.

* * * * *

UNITED STATES PATENT AND TRADEMARK OFFICE
CERTIFICATE OF CORRECTION

PATENT NO. : 4,818,385

DATED : April 4, 1989

INVENTOR(S) : Frank W. Medley, III

It is certified that error appears in the above-identified patent and that said Letters Patent is hereby corrected as shown below:

Claim 15, Column 18, lines 49-50, after "outwardly", delete -- an elevation extending across at least a portion of said plate --.

Signed and Sealed this

Twenty-eighth Day of November 1989

Attest:

JEFFREY M. SAMUELS

Attesting Officer     Acting Commissioner of Patents and Trademarks